(12) United States Patent
Holliday

(10) Patent No.: US 9,400,905 B2
(45) Date of Patent: Jul. 26, 2016

(54) SAFETY SYSTEM AND METHOD

(71) Applicant: Antony James Holliday, Cleveland (GB)

(72) Inventor: Antony James Holliday, Cleveland (GB)

( * ) Notice: Subject to any disclaimer, the term of this patent is extended or adjusted under 35 U.S.C. 154(b) by 8 days.

(21) Appl. No.: 14/322,038

(22) Filed: Jul. 2, 2014

(65) Prior Publication Data

US 2015/0019045 A1 Jan. 15, 2015

(30) Foreign Application Priority Data

Jul. 4, 2013 (GB) .................................. 1312043.1

(51) Int. Cl.
| G05D 1/00 | (2006.01) |
| G06K 7/10 | (2006.01) |
| B63H 25/02 | (2006.01) |
| G06K 19/077 | (2006.01) |
| B63H 21/21 | (2006.01) |

(52) U.S. Cl.
CPC ............ *G06K 7/10366* (2013.01); *B63H 25/02* (2013.01); *G06K 19/07762* (2013.01); *B63H 2021/216* (2013.01); *B63H 2025/028* (2013.01)

(58) Field of Classification Search
CPC ... B63H 21/21; B63H 21/22; B63H 2025/028
USPC .................... 701/2, 21; 340/8.1, 539.1, 568.1
See application file for complete search history.

(56) References Cited

U.S. PATENT DOCUMENTS

| 4,630,205 | A | 12/1986 | Otaka |
| 7,698,052 | B2* | 4/2010 | Yamada et al. ............... 701/110 |
| 8,659,432 | B2* | 2/2014 | Alicea-Ibern et al. ..... 340/573.1 |
| 2004/0222891 | A1 | 11/2004 | Ehlers |
| 2005/0200204 | A1* | 9/2005 | Jonsson et al. ............... 307/10.3 |

FOREIGN PATENT DOCUMENTS

GB  2 336 928 A  11/1999

* cited by examiner

*Primary Examiner* — Luke Huynh
(74) *Attorney, Agent, or Firm* — Howard & Howard Attorneys PLLC

(57) ABSTRACT

A safety system for a boat includes a base unit securable to the boat and operably connected to one or more of the boat steering, engine and throttle controls. The base unit comprises a radio-frequency identification (RFID) reader and speed measuring means. The safety system also includes a portable unit securable to a person on the boat, with the portable unit comprising a radio-frequency identification (RFID) transmitter. The RFID reader and RFID transmitter are adapted to wirelessly communicate with one another when the portable unit is within a predetermined range of the base unit. There is also described a method of controlling a boat.

16 Claims, 1 Drawing Sheet

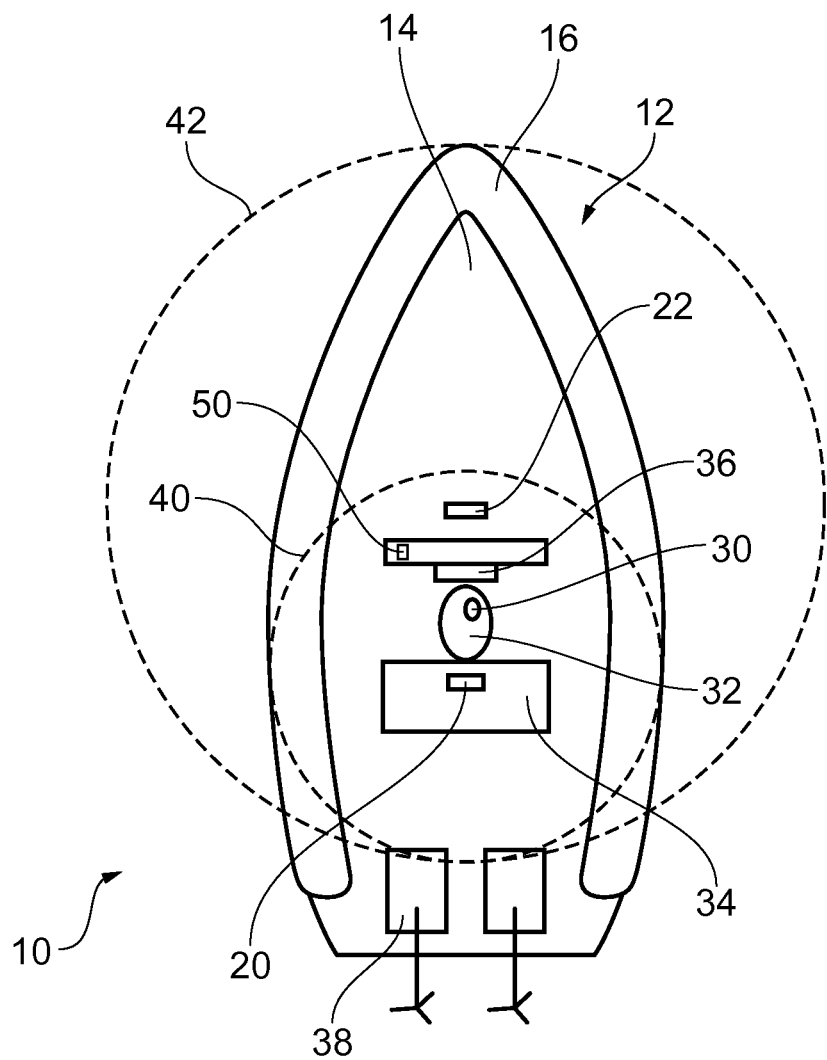

SAFETY SYSTEM AND METHOD

RELATED APPLICATIONS

This application claims priority to and all the advantages of Great Britain Patent Application No. GB 1312043.1, filed on Jul. 4, 2013.

The present invention relates to a safety system and method for a boat.

Kill cords or safety lanyard cords are common marine safety devices. They are particularly used for motorboats, jet skis and rigid inflatable boats (RIBs) that use an engine. They are used to ensure that should the helm of the boat fall overboard, the boats engine is stopped. This gives the helm the chance to swim back to the boat and ensure that the boat does not operate uncontrolled in the water.

A kill cord is normally made of a plastic coated cable with a wire or rope core. The kill cord may be coiled and is often coloured red. One end of the cord attaches to a kill switch near the controls of the boat, the other end is looped round an arm, leg, wrist or buoyancy aid of the helm and secured to itself with a fastener.

In the event of the helm falling overboard, the kill cord is pulled away from the kill switch and the engine is stopped. The engine can only be started again when the kill cord is attached to the kill switch.

The conventional kill cord device is commonly used for its simplicity but is frequently circumvented by helmsman who find that it restricts their movement or that it is an apparently unnecessary inconvenience. Unfortunately every year many people are seriously hurt and others killed by a boat whose engine(s) have continued to run despite the absence of the helmsman.

In accordance with a first aspect of the present invention there is provided a safety system for a boat, the safety system comprising:

a base unit securable to the boat and operably connected to one or more of the boat steering, engine and throttle controls, the base unit comprising a radio-frequency identification (RFID) reader and speed measuring means; and a portable unit securable to a person on the boat, the portable unit comprising a radio-frequency identification (RFID) transmitter;

wherein the RFID reader and RFID transmitter are adapted to wirelessly communicate with one another when the portable unit is within a predetermined range of the base unit.

It is an advantage of the present invention that the communication between the portable unit and the base unit is wireless. This means the access that the person on the boat has to the various areas of the boat may be unrestricted but movement of the person on the boat outside the predetermined range may affect operation of one or more of the boat steering, engine and throttle. The person on the boat may move outside the predetermined range if they fall overboard.

The RFID transmitter may be an active transmitter, that is the RFID transmitter includes a battery that is used to periodically transmits a signal. The RFID transmitter may be a semi-passive transmitter, that is the RFID transmitter includes a battery and may be activated by a signal from the RFID reader. When activated, the RFID transmitter uses the battery to transmit a signal.

The RFID transmitter is typically a passive transmitter, that is the RFID transmitter relies on a first signal from the RFID reader to power the transmission of a second signal. The first signal from the RFID reader may be a form of electromagnetic radiation and more specifically the electromagnetic radiation may have a wavelength of from 30 kHz to 300 GHz.

Using a passive RFID transmitter may be an advantage of the present invention because the portable unit securable to the person on the boat does not require a battery that would need regular charging or replacing. This mitigates the risk that a battery relied upon for proper operation of the safety system remains uncharged and as a result the person on the boat seeks to bypass the system in order to operate the boat, thereby exposing them and probably other persons nearby to unnecessary risk of injury.

The person on the boat is typically the helm or helmsman.

The predetermined range may be less than or equal to 100 meters, typically less than or equal to 10 meters, normally less than or equal to 2 meters and preferably less than or equal to 1 meter.

The boat steering may include the rudder. The boat engine may include the supply of air and/or fuel to the engine. The base unit may be operably connected to one or more of the boat steering, engine and throttle such that the boat can only be operated and/or controlled with a suitable output from the base unit. The output is typically an electronic output.

The speed measuring means is typically a global positioning system (GPS). The speed measuring means may be a pilot tube and/or turbine.

The RFID reader and RFID transmitter may communicate, that is a signal pass between the RFID reader and RFID transmitter, more than or equal to once every 30 seconds, may be more than or equal to once every 10 seconds, optionally more than or equal to once every 5 seconds and typically more than or equal to once every 1 second.

The rate of communication between the RFID reader and RFID transmitter may be dependent on the speed of the boat, measurable using the speed measuring means. As the speed of the boat increases, the interval between signals passed between the RFID transmitter and RFID reader may decrease.

Communication between the RFID reader and RFID transmitter is normally used to confirm the portable unit securable to the person on the boat is located close to the base unit securable to the boat.

The boat may more specifically be a rigid inflatable boat (RIB), a rigid hulled inflatable boat (RHIB), yacht or ship.

The system may further include an override facility. The override facility may allow the person on the boat to bypass the safety system such that one or more of the boat steering, engine and throttle can be operated for a predetermined period of time without the suitable output from the base unit. The base unit will only provide the suitable output when the RFID reader and RFID transmitter are within the predetermined range.

The override facility typically comprises a switch or button that, in use, can be pressed by the person on the boat to activate the override facility. The switch or button is normally a time delay switch or button that once pressed returns to an original state to end the override facility after the predetermined period of time.

The predetermined period of time is typically from 1 to 120 seconds, normally from 1 to 60 seconds and preferably from 1 to 30 seconds.

The predetermined period of time is set to allow the person on the boat, typically the helm, to leave the controls of the boat for a relatively short period of time, thereby allowing the person on the boat to perform one or more functions or operations other than controlling one or more of the boat steering, engine and throttle controls.

The override facility may optionally allow the person on the boat to bypass the safety system such that one or more of the boat steering, engine and throttle can be operated without a suitable output from the base unit for an unlimited period of time, so long as the speed of the boat measurable using the speed measuring means is less than or equal to a predetermined speed.

The predetermined speed may be less than or equal to 10 mph, optionally less than or equal to 7 mph, may be less than or equal to 5 mph and typically less than or equal to 3 mph. If the speed of the boat increases above the predetermined speed when the override facility is active, one or more of the boat steering, engine and throttle may be stopped.

This is a particular advantage over other known safety systems because it takes into account the speed of the boat. There is a reduced risk of injury to the person on the boat and/or other persons nearby if the speed of the boat is less than or equal to for example 3 mph. The person on the boat may therefore be more inclined to use the safety system if routine operations and/or manoeuvres about the boat can be performed without inhibition, whilst the risk to the person on the boat and other persons nearby is mitigated should the person on the boat fall overboard.

The override facility may allow the person on the boat to bypass the safety system such that one or more of the boat steering, engine and throttle can be operated without a suitable output from the base unit for the predetermined period of time, so long as the speed of the boat measurable using the speed measuring means is less than or equal to the predetermined speed.

The safety system of the present invention is particularly useful for single-handed boats, particularly rigid inflatable boats (RIBs) that require the helm to control the boat and for example dock and secure the boat to a mooring or jetty or reach out of the boat to collect or retrieve an item or person whist remaining at and/or in control of the boat.

The RFID transmitter may be a high frequency RFID transmitter. The high frequency RFID transmitter may be adapted to transmit a signal at from 10 to 15 MHz. The high frequency RFID transmitter typically reduces the likelihood of interference between the signal transmitted by the RFID transmitter and other nearby or adjacent electronic equipment.

The RFID transmitter can be a read only or a read/write transmitter. The RFID transmitter may be programmable either before installation, for example at a factory, or in the field. The RFID transmitter may be programmable to include information specific to the person on the boat that the portable unit and so also the RFID transmitter is attached. The information may include data regarding one or more of the age, experience and qualification of the person to operate the boat.

It is an advantage of the present invention that the communication between the RFID reader and RFID transmitter is possible regardless of the relative position of the RFID reader and RFID transmitter. This means that the person on the boat to which the portable unit is securable can move in any direction relative to the base unit attached to the boat.

The portable unit securable to the person on the boat may be securable to a part of the body and/or clothing of the person. The clothing may include a wetsuit, a drysuit, footwear and a buoyancy aid. The part of the body may include an arm, a leg and a wrist. The portable unit may be in the form a wristband or bracelet.

The system may comprise more than one portable unit securable to more than one person on the boat. One portable unit is typically securable to one person; a second portable unit is typically securable to a second person. Different portable units can be attached to different persons depending on one or more of the age, experience and qualification of the person to operate the boat.

In accordance with a second aspect of the present invention there is provided a method of controlling a boat, the method including the steps of:

securing a base unit to a boat, the base unit comprising a radio-frequency identification (RFID) reader and speed measuring means;

securing a portable unit to a person on the boat, the portable unit comprising a radio-frequency identification (RFID) transmitter;

wirelessly transmitting a signal between the RFID transmitter and the RFID reader when the RFID transmitter and the RFID reader are less than or equal to a predetermined distance apart;

measuring the speed of the boat using the speed measuring means; and controlling one or more of the boat steering, engine and throttle controls, wherein operation of one or more of these controls depends on the signal transmitted between the RFID transmitter and the RFID reader and the speed of the boat measured using the speed measuring means.

The signal transmitted between the RFID transmitter and the RFID reader and the speed of the boat measured using the speed measuring means may generate an output from the base unit. The output from the base unit to one or more of the boat steering, engine and throttle controls is typically electronic and may be wirelessly transmitted.

The one or more of the boat steering, engine and throttle controls, and the output from the base unit may be component parts of a closed-circuit system or an open-circuit system. The closed- and open-circuit systems may be electronic and/or wireless.

The output from the base unit depends on data about the distance between the RFID transmitter and the RFID reader and data about the speed of the boat measured using the speed measuring means. The output from the base unit is typically used to verify or refute the location of the person on the boat relative to the base unit.

In the closed-circuit system the output from the base unit completes or closes the circuit when the RFID reader and the RFID transmitter are less than a predetermined distance apart and the speed of the boat measured using the speed measuring means is less than a predetermined speed.

The predetermined speed of the boat measured using the speed measuring means may be less than or equal to 10 mph, optionally less than or equal to 7 mph, may be less than or equal to 5 mph and typically less than or equal to 3 mph. The speed measuring means is used to measure the speed of the boat. The position of the boat is of no or at least of lesser importance. The speed measuring means is typically a global positioning system (GPS).

The predetermined range may be less than or equal to 100 meters, typically less than or equal to 10 meters, normally less than or equal to 2 meters and preferably less than or equal to 1 meter.

The base unit is typically secured to the boat at or near to one or more of the steering, engine and throttle controls.

The method may include a backup step, such that the one or more of the boat steering, engine and throttle controls can be used by a second person in the event that the person on the boat is not present or is incapacitated. This may be particularly useful should the boat need to be moved in an emergency by for example the emergency services.

The step of controlling one or more of the boat steering, engine and throttle controls, wherein operation of one or more of these controls depends on the signal transmitted between the RFID reader and the RFID transmitter and the speed of the boat measured using the speed measuring means may be referred to as a failsafe mechanism.

The optional features of the first aspect of the present invention can be incorporated into the second aspect of the present invention and vice versa.

An embodiment of the invention will now be described by way of example only and with reference to the accompanying drawings, in which:

FIG. 1 is a schematic plan view of a security system according to the present invention.

FIG. 1 shows a safety system 10 for a boat 12 having a hull 14 and inflatable collar 16.

The safety system 10 includes a base unit 20 secured to the boat 12, the base unit comprising a radio-frequency identification (RFID) reader and a global positioning system (GPS) (not shown). The GPS is the speed measuring means. A portable unit 30 is secured to a person 32 on the boat 12, the portable unit 30 comprises a radio-frequency identification (RFID) transmitter (not shown).

The RFID reader and RFID transmitter are adapted to wirelessly communicate with one another when the portable unit 30 is within a predetermined range 40 of the base unit 20. The safety system 10 shown in FIG. 1 shows a second base unit 22 and its corresponding predetermined range 42.

The person 32 on the boat 12, also referred to as the helm, helmsman, or driver is shown sitting on the seat 34 in front of the steering wheel, throttle and other engine controls 36. The engines 38 are at the stern of the boat 12. The person 32 on the boat 12 shown in FIG. 1 is the helmsman.

The base units 20, 22 are operably connected to the boat engine controls 36 and so also the engines 38.

The predetermined range 40, that is the radius of a wireless field surrounding the base unit 20 is 1 meter. The predetermined range 42, that is the radius of a wireless field surrounding the base unit 22 is 2 meters.

The access the helmsman 32 has to the various areas of the boat 12 is unrestricted but movement of the helmsman 32 outside the predetermined range 40 or 42 affects operation of the engines 38. The helmsman 32 would move outside the predetermined range 40 should he fall overboard and outside the predetermined range 42 should he fall overboard to the port or starboard side of the boat 12 and the boat 12 and helmsman 32 then become separated.

The predetermined range 42 covers the water to the port and starboard sides of the boat 12 but not the bow or stern where the helmsman is most likely to be injured should he fall overboard. If the helmsman 32 falls overboard at the bow or stern of the boat 12 the RFID reader and RFID transmitter cannot wirelessly communicate with one another because the portable unit 30 is outwith the predetermined range 42 of the base unit 22 and as a result the engines 38 are stopped.

The RFID reader and RFID transmitter (not shown) communicate, that is a signal passes between the RFID reader and RFID transmitter, once every 5 seconds. The communication between the RFID reader and RFID transmitter (not shown) is used to confirm the portable unit 30 is located close to the base unit 20, 22 and inside the corresponding predetermined range 40, 42.

The system 10 includes an override facility that allows the helmsman 32 to bypass the safety system and continue to operate the boat steering, engine and throttle for 30 seconds, whilst the RFID transmitter and therefore the portable unit 30 are outside the predetermined range 40, 42. The override facility includes a button 50 located at the steering wheel, throttle and other engine controls 36.

The predetermined 30 second period of time allows the helmsman 32 to leave the controls 36 of the boat 12 to secure the boat 12 to a mooring or jetty (not shown).

The override facility allows the helmsman 32 to bypass the safety system and continue to operate the boat steering, engine and throttle so long as the speed of the boat 12 measurable using the GPS (not shown) is less than or equal to 3 mph. If the speed of the boat 12 increases above the predetermined 3 mph speed when the override facility is active, the engines 38 are stopped.

Operation of the engines 38 relies on the signal being transmitted between the RFID transmitter and the RFID reader and the speed of the boat 12 measured using the GPS being less than or equal to 3 mph.

The portable unit 30 is in the form of a bracelet and is worn on the wrist of the helmsman 32.

Modifications and improvements can be incorporated without departing from the scope of the invention.

The invention claimed is:

1. A safety system for a boat, the safety system comprising:
a base unit securable to the boat and operably connected to one or more of the boat steering, engine and throttle controls, the base unit comprising a radio-frequency identification (RFID) reader and speed measuring means; and
a portable unit securable to a person on the boat, the portable unit comprising a radio-frequency identification (RFID) transmitter;
wherein the RFID reader and RFID transmitter are adapted to wirelessly communicate with one another when the portable unit is within a predetermined range of the base unit, and
wherein the base unit is operably connected to one or more of the boat steering, engine and throttle such that the boat can only be operated with a suitable output from the base unit and wherein the system further includes an override facility, the override facility allowing the person on the boat to bypass the safety system such that one or more of the boat steering, engine and throttle can be operated for a predetermined period of time without the suitable output from the base unit.

2. A safety system for a boat according to claim 1, wherein the RFID transmitter is a passive transmitter relying on a first signal from the RFID reader to power the transmission of a second signal.

3. A safety system for a boat according to claim 2, wherein the first signal from the RFID reader is a form of electromagnetic radiation having a wavelength of from 30 kHz to 300 GHz.

4. A safety system for a boat according to claim 1, wherein the predetermined range is less than or equal to 2 meters.

5. A safety system for a boat according to claim 1, wherein the boat steering includes a rudder.

6. A safety system for a boat according to claim 1, wherein the boat engine includes a supply of fuel to the boat engine.

7. A safety system for a boat according to claim 1, wherein the override facility comprises a time delay switch that, in use, is moveable by the person on the boat and that returns to an original state to end the override facility after the predetermined period of time.

8. A safety system for a boat according to claim 1, wherein the RFID reader and RFID transmitter communicate such that a signal is passable between the RFID reader and RFID transmitter, more than or equal to once every 5 seconds.

9. A safety system for a boat according to claim 8, wherein the communication between the RFID reader and RFID transmitter is used to confirm the portable unit securable to the person on the boat is located close to the base unit securable to the boat.

10. A safety system for a boat according to claim 1, wherein the predetermined period of time is from 1 to 30 seconds.

11. A safety system for a boat according to claim 1, wherein the one or more of the boat steering, engine and throttle can be operated without the suitable output from the base unit for the predetermined period of time, so long as the speed of the boat measurable using the speed measuring means is less than or equal to a predetermined speed.

12. A safety system for a boat according to claim 11, wherein the predetermined speed is less than or equal to 5 mph.

13. A safety system for a boat according to claim 1, wherein the RFID transmitter is a high frequency RFID transmitter adapted to transmit a signal at from 10 to 15 MHz.

14. A method of controlling a boat, the method including the steps of:
- securing a base unit to a boat, the base unit comprising a radio-frequency identification (RFID) reader and speed measuring means;
- securing a portable unit to a person on the boat, the portable unit comprising a radio-frequency identification (RFID) transmitter;
- wirelessly transmitting a signal between the RFID transmitter and the RFID reader when the RFID transmitter and the RFID reader are less than or equal to a predetermined distance apart;
- measuring the speed of the boat using the speed measuring means; and
- controlling one or more of the boat steering, engine and throttle controls, wherein operation of one or more of these controls depends on the signal transmitted between the RFID transmitter and the RFID reader and the speed of the boat measured using the speed measuring means,
- wherein the signal transmitted between the RFID transmitter and the RFID reader and the speed of the boat measured using the speed measuring means generate an output from the base unit, the output from the base unit to one or more of the boat steering, engine and throttle controls being electronically and wirelessly transmitted, and
- wherein the output from the base unit is used to verify the location of the person on the boat relative to the base unit.

15. A method of controlling a boat according to claim 14, wherein the one or more of the boat steering, engine and throttle controls, and the output from the base unit are component parts of a closed-circuit system.

16. A method of controlling a boat according to claim 14, wherein the one or more of the boat steering, engine and throttle controls, and the output from the base unit are component parts of a closed-circuit system and wherein in the closed-circuit system the output from the base unit closes the circuit when the RFID reader and the RFID transmitter are less than a predetermined distance apart and the speed of the boat measured using the speed measuring means is less than or equal to 5 mph.

\* \* \* \* \*